United States Patent
Pate

(10) Patent No.: US 7,023,619 B2
(45) Date of Patent: Apr. 4, 2006

(54) DIGITAL PROJECTION SYSTEM OPTICAL REFLECTOR HAVING FACETS

(75) Inventor: Michael Pate, Tucson, AZ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 12 days.

(21) Appl. No.: 10/872,213

(22) Filed: Jun. 17, 2004

(65) Prior Publication Data

US 2005/0280905 A1    Dec. 22, 2005

(51) Int. Cl.
*G02B 27/00* (2006.01)
(52) U.S. Cl. ......................... 359/618; 353/37
(58) Field of Classification Search ................ 359/858; 353/37
See application file for complete search history.

(56) References Cited

U.S. PATENT DOCUMENTS

| | | | |
|---|---|---|---|
| 3,620,600 A | 11/1971 | Lindberg | |
| 4,021,659 A | 5/1977 | Wiley | |
| 4,512,631 A | 4/1985 | VanBreemen | |
| 4,545,000 A | 10/1985 | Fraley et al. | |
| 5,098,184 A | 3/1992 | van den Brandt et al. | |
| 5,510,861 A | 4/1996 | Minich et al. | |
| 5,704,701 A * | 1/1998 | Kavanagh et al. | 353/33 |
| 6,102,545 A | 8/2000 | Ogino | |
| 6,344,876 B1 | 2/2002 | Shiomi | |
| 6,356,700 B1 | 3/2002 | Strobl | |
| 6,621,610 B1 | 9/2003 | Sowa et al. | |
| 2002/0122157 A1 | 9/2002 | Miyawaki et al. | |
| 2002/0154423 A1 | 10/2002 | Gubela, Sr. | |
| 2004/0012832 A1 | 1/2004 | Gallen et al. | |

* cited by examiner

*Primary Examiner*—Scott J. Sugarman
*Assistant Examiner*—Darryl J. Collins

(57) ABSTRACT

An optical reflector is positionable between one or more light sources and one or more spatial light modulators (SLM's) within a digital projection system. The optical reflector includes a substrate having a surface to render non-uniform light from the light sources to the SLM's more uniform with one reflection off the substrate, and a number of facets within the surface of the substrate.

42 Claims, 6 Drawing Sheets

DIGITAL PROJECTION SYSTEM OPTICAL REFLECTOR HAVING FACETS

BACKGROUND

Projector systems are generally devices that integrate light sources, optics systems, and electronics for front- or rear-projection of images from computers or video devices onto walls or screens, for large-image viewing. They are especially popular among business users who give presentations as part of their job responsibilities. Newer projectors can weigh as little as a few pounds, making them well suited for business travelers. As the quality of projection technology has improved, projectors are also finding their way into peoples' homes for high-definition television (HDTV) and other home entertainment applications.

One type of projection system is a digital projection system that utilizes spatial light modulators (SLM's) to project image data therefrom. Examples of SLM's include liquid crystal display (LCD) SLM's, and digital micromirror device (DMD) SLM's, Liquid Crystal on Silicon (LCoS) SLM's, as well as other types of SLM's. There may be one pixel on each SLM in the projector for each pixel of digital image data to be projected. The projection system controls the SLM pixel or pixels in accordance with the pixel of the image data to which the SLM pixel corresponds. The SLM pixel modulates the light that is incident to the SLM pixel in accordance with the image data pixel, and the projector projects the pixel.

Light sources when combined with reflectors and or lenses typically found in digital projection systems output converging, diverging or collimated light that, due to the nature of the light sources, is more bright at the center of the beam than at the edges of the beam. If this light from the source and the reflector is used to illuminate the SLM it will be too bright in the center of the SLM and dimmer around the edges. Left uncorrected, such light results in image projection that may be too bright at the center of the image and too dim at the edges of the image. To correct this problem, digital projection systems typically include illumination systems with complicated optics mechanisms that are made up of a number of lenses, mirrors, and/or condenser optics. The purpose of the illumination system is to capture light from the source and spatially homogenize the light so that it can provide essentially uniform illumination of the SLM, so that this can be imaged onto the screen for viewing. Even then, however, the problem is not completely corrected, and including such sophisticated illumination optics mechanisms raises the costs of digital projectors.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Digital Projection System

Figure 1:
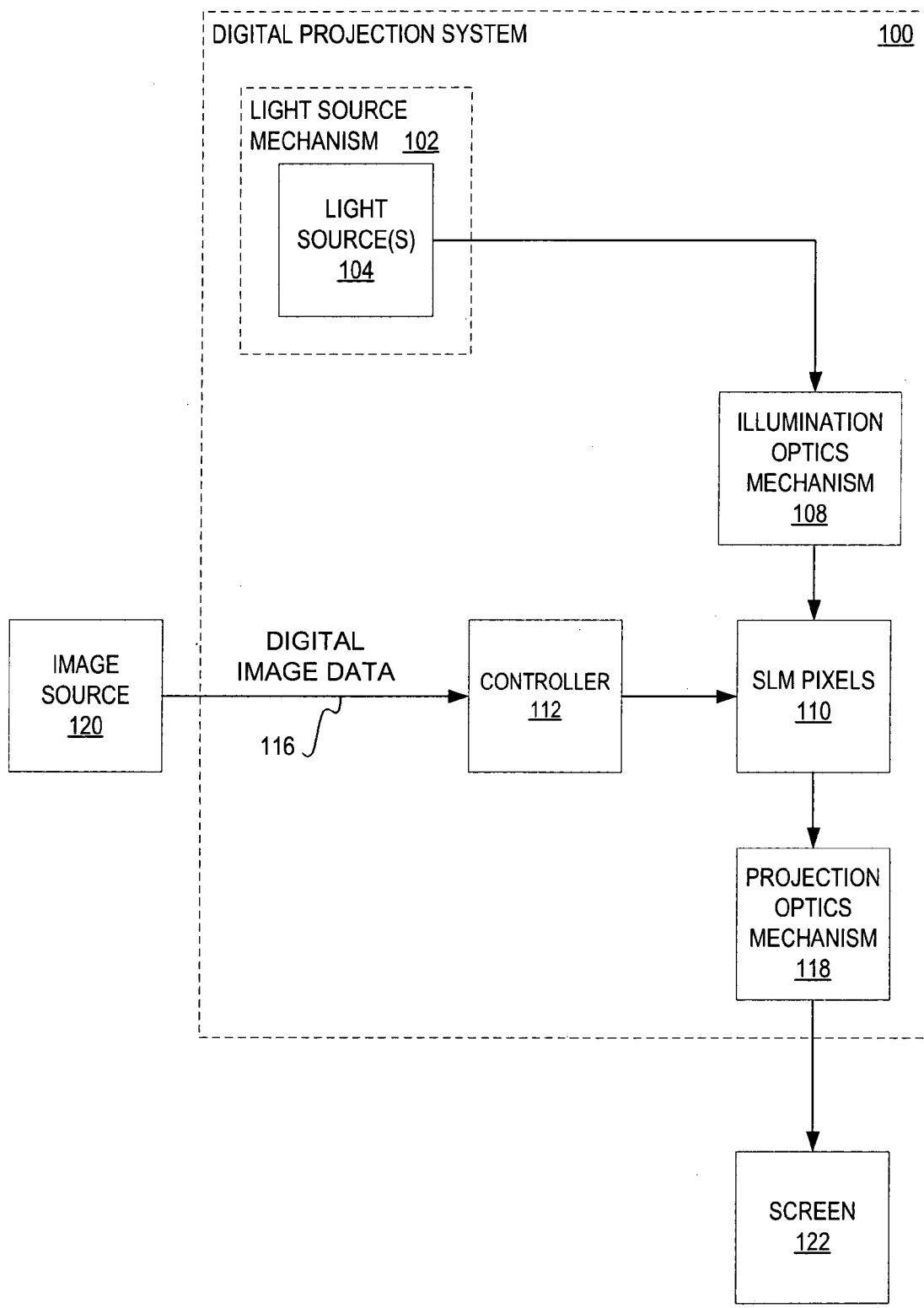
FIG. 1 is a block diagram of a digital projection system, according to an embodiment of the invention.

FIG. 1 shows a block diagram of a digital projection system 100 according to an embodiment of the invention. The system 100 may be implemented as a digital projector. The system 100 includes components specific to a particular embodiment of the invention, but may include other components in addition to or in lieu of the components depicted in FIG. 1. The projection system 100 includes a light source mechanism 102 that includes light source(s) 104, an illumination optics mechanism 108, spatial light modulator (SLM) pixels 110, and a projection optics mechanism 118. The system 100 also includes a controller 112, which is operatively or otherwise coupled to an image source 120, as well as to a screen 122. The controller 112 receives analog or digital image data 116 from the image source 120. The mechanisms 102, 108, and 118 may include one or more mirrors, or reflectors, one or more lenses, and/or one or more of other types of constituent components. The illumination optics mechanism 108 particularly includes a multi-faceted reflector or mirror, as is described in detail in later sections of the detailed description.

The light source(s) 104 of the light source mechanism 102 output light. Each of the light source(s) 104 may be an ultra high-pressure (UHP) mercury vapor arc lamp, xenon, or another type of light source. For instance, the light source(s) may be other types of light bulbs, as well as other types of solid state light sources such as light-emitting diodes (LED's), and so on. The light output by the light source(s)

104 is for ultimate modulation by the SLM pixels 110. The light output by the light source(s) 104 may be convergent, divergent or collimated, and is typically brighter at the middle or center than at the edges. The illumination optics mechanism 108 spatially homogenizes and guides the light as output by the light source(s) 104 to the SLM pixels 110 for correct modulation thereby.

The SLM pixels 110 may be liquid crystal display (LCD) SLM's, digital micromirror device (DMD) SLM's, as well as other types of SLM's. The number and configuration of the SLM pixels 110 enables the projection system 100 to realize a given resolution, such as a 4:3 aspect ratio such as 800×600 or 1024×768, or a 16:9 aspect ratio such as 1920×1080 or 1280×720. The controller 112 controls the SLM pixels 110 in accordance with the digital image data 116 that is received from the image source 120. The image source 120 may be a computing device, such as a computer, or another type of electronic and/or video device. The controller 112 in one embodiment particularly sets the SLM pixels 110 in accordance with the saturation intensity or other values of the pixels of the image data 116. Furthermore, the controller 112 may scale the image data 116 from one resolution to another, so that the resolution of the image data 116 ultimately conforms to that of the SLM pixels 110. Alternatively, the controller 112 may receive the image data 116 as having the same resolution as that of the SLM pixels 110.

The SLM pixels 110 ultimately modulate the light output by the light source(s) 104 in accordance with the image data 116 as controlled by the controller 112. The image data 116 may be a still image or a moving image, for instance. The projection optics mechanism 118 projects this light externally or outward from the projection system 100, where it is displayed on the screen 122, or another physical object, such as a wall, and so on. The screen 122 may be a front screen or a rear screen, such that the projection system 100 may be a front-projection system or a rear-projection system. The projection optics mechanism 118 guides the light as modulated by the SLM pixels 110 outward from the system 100. The user of the projection system 100, and other individuals able to see the screen 122, are then able to view the image data 116.

The projection system 100 is a digital projection system 100 because the SLM pixels 110 each modulate one pixel or sub-pixel of the digital image data 116 as presented to the SLM pixels 110 by the controller 112. As such, the light source(s) 104 output light, as affected by the illumination optics mechanism 108, to each of the SLM pixels 110. Where the light output by the light source(s) 104 is brighter at the center than at its edges, the resulting image projected from the system 100 onto the screen 122 is also brighter at the center than at the edges. Therefore, the illumination optics mechanism 108 is responsible for rendering illumination from the light source(s) 104 onto the SLM pixels 110 that it is at least substantially spatially uniform, so that the resulting image projected onto the screen 122 has substantially uniform brightness.

Figure 2A:
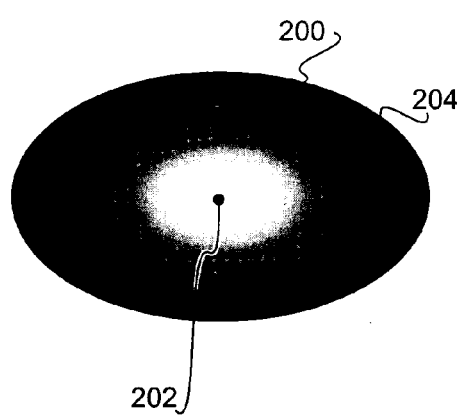
FIG. 2A is a diagram of the illumination profile of the light output by the light source(s) of a digital projection system, according to an embodiment of the invention.

FIG. 2A shows an example of the illumination profile 200 of the light source(s) 104, according to an embodiment of the invention. The illumination profile 200 is elliptical in shape in one embodiment of the invention, and has a center 202 and an outside edge 204. The illumination profile 200 may also be circular. The shading of the illumination profile 200 is indicative of the brightness of the light output by the light source(s) 104. That is, the light output by the light source(s) 104 is brighter at the center 202, and becomes dimmer towards the outside edges 204.

Figure 2B:
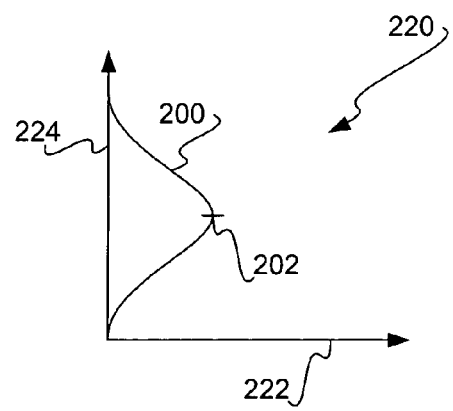
FIG. 2B is a diagram of the illumination profile of FIG. 2A in a graphical manner, according to an embodiment of the invention.

FIG. 2B shows a graphical depiction of the illumination profile 200 of FIG. 2A, according to an embodiment of the invention. The profile 200 is mapped as a graph 220, having intensity or illumination on the x-axis 222 as a function of location on the y-axis 224. As depicted in FIG. 2B, there is maximum illumination at the center 202, and the illumination decreases in accordance with a Gaussian curve farther from the center 202.

Figure 2C:
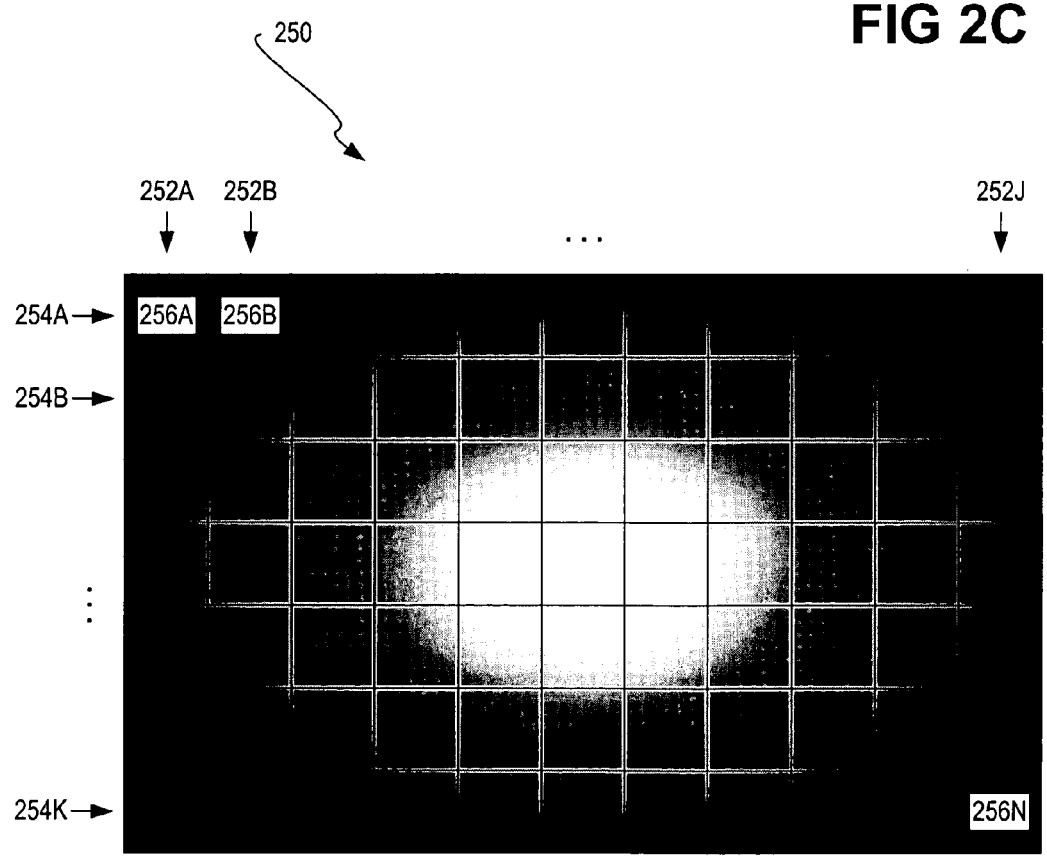
FIG. 2C is a diagram of the resulting image projected by a digital projection system having light source(s) that have the illumination profile of FIGS. 2A and 2B, where corrective illumination optics are not employed, according to an embodiment of the invention.

FIG. 2C shows an example of a digital image 250 projected by the digital projection system 100 onto the screen 122, without the benefit of the illumination optics mechanism 108 to render the light output by the light source(s) 104 more uniform, according to an embodiment of the invention. The digital image 250 includes a number of image pixels 256A, 256B, . . . , 256N, collectively referred to as the image pixels 256. The image pixels 256 are organized in a number of columns 252A, 252B, . . . , 252J, collectively referred to as the columns 252, and a number of rows 254A, 254B, . . . , 254K, collectively referred to as the rows 254. The number of columns 252 and the number of rows 254 correspond to the resolution realized by the SLM pixels 110.

The shading of the digital image 250 is indicative of the brightness with which the digital image 250 is projected onto the screen 122, and corresponds to the brightness of the illumination profile 200 of FIG. 2A. Thus, those of the pixels 256 towards the center of the digital image 250 have greater brightness as compared to those of the pixels 256 towards the edges of the digital image 250. The inclusion of the illumination optics mechanism 108, however, renders the illumination profile 200 of the light output from the light source(s) more uniform before it arrives at the SLM pixels 110. Therefore, the digital image 250 correspondingly is projected by the system 100 more uniformly from the perspective of the brightness of the image 250.

Concave Multi-Faceted Optical Mirror

Figure 3:
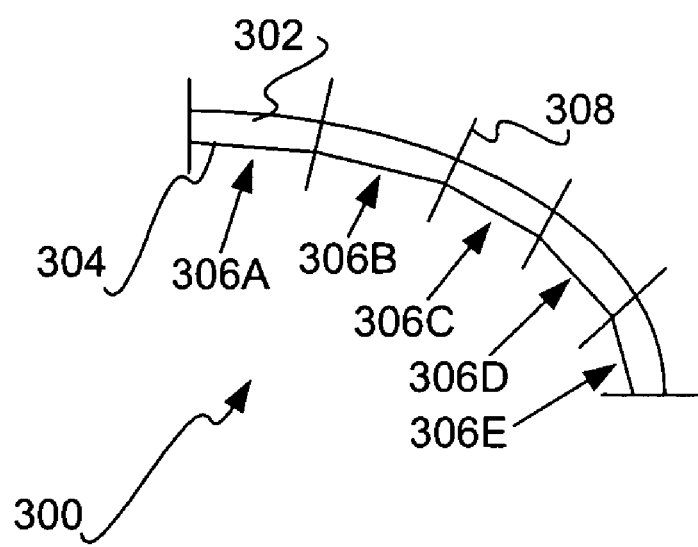
FIG. 3 is a cross-sectional diagrams of a multi-faceted reflector to render illumination of light from light source(s) to spatial light modulators (SLM's) of a digital projection system more uniform, according to an embodiment of the invention.

FIG. 3 shows a cross section of a multi-faceted optical reflector 300, or mirror, which is part of the illumination optics mechanism 108, according to an embodiment of the invention. The reflector 300 of the embodiments of FIG. 3 affects the light output by the light source(s) 104 of the light source mechanism 102 before the light arrives at the spatial light modulator (SLM) pixels 110. The reflector 300 particularly affects the light output by the light source(s) 104 by rendering illumination of the light more uniform when it arrives at the SLM pixels 110, due to the inclusion of facets 306 within the reflector 300. The reflector 300 thus renders illumination from the light source(s) 104 more spatially uniformly on the SLM pixels 110 within the digital projection system 100. In general, the more facets 306 there are within the reflector 300, the more uniformly the illumination of the light from the light source(s) 104 is rendered by the reflector 300.

In FIG. 3, the multi-faceted optical reflector 300 is a partially elliptically shaped mirror having an optical substrate 302 and a mirrored surface 304. The substrate 302 is partially elliptically shaped, which gives the reflector 300 its partially elliptical shape. The facets 306A, 306B, 306C, 306D, and 306E, collectively referred to as the facets 306, are part of the surface 304, and thus part of the substrate 302. Just five facets 306 are depicted in FIG. 3 for illustrative clarity, whereas in actuality there may be tens, hundreds, or more of the facets 306. The facets 306 are also divided in FIG. 3 by imaginary orthogonal lines, such as the line 308, which are included only so that the individual facets 306 are more clearly discernable and recognizable in the figure. A facet is defined generally as a separate section or visual unit of the reflector 300, having a shape that is contiguous with the shapes of adjacent facets but which is not continuous with the shapes of the adjacent facets. For instance, the facets 306 in FIG. 3 are flat in shape, but the line defining the shape of each of the facets 306 is not parallel to the line defining the shapes of adjacent of the facets 306.

Figure 4A:
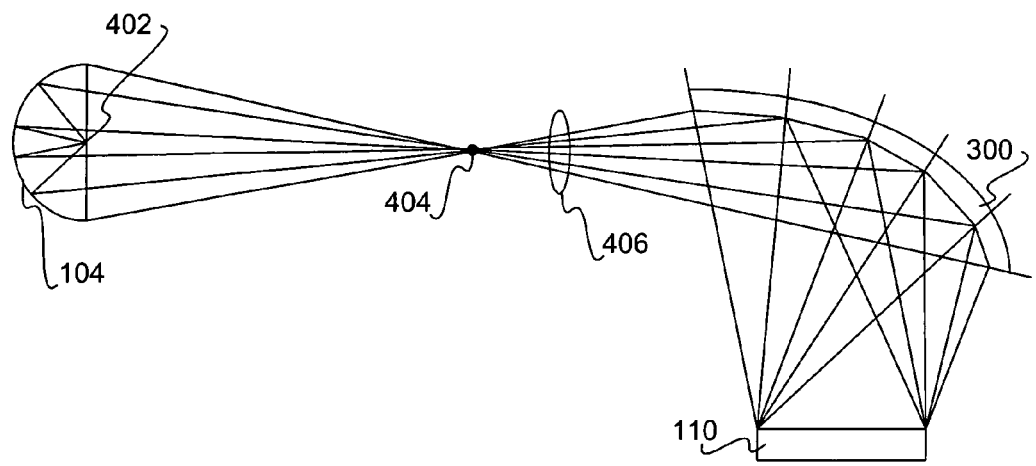
FIGS. 4A and 4B are diagrams depicting example manners by which a multi-faceted reflector is able to render light more uniformly within a digital projection system, according to varying embodiments of the invention.
Figure 4B:
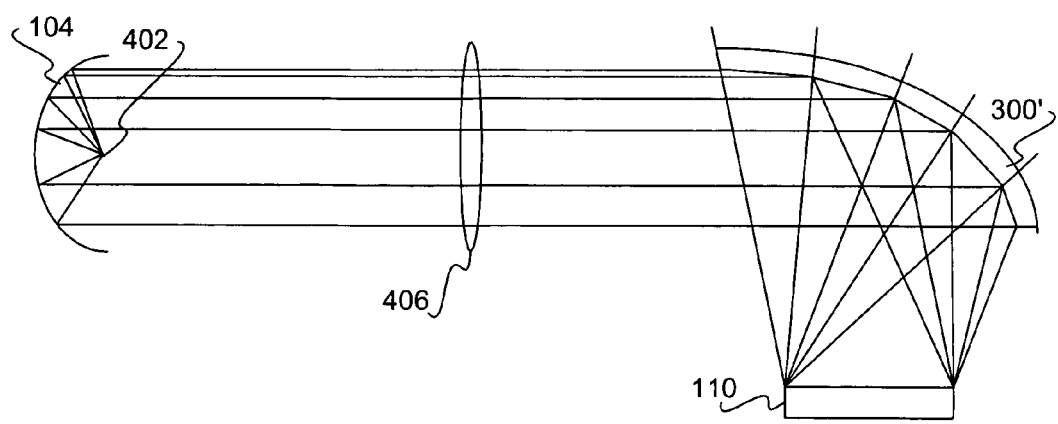

FIGS. 4A and 4B show examples of the manner by which the reflector 300 of FIG. 3 in particular is able to render light more uniformly onto the SLM pixels 110, according to varying embodiments of the invention. The facets 306 of the reflector 300 are not specifically called out in FIGS. 4A and 4B for purposes of illustrative clarity. The light source(s) 104 emits the rays of light 406, and in FIG. 4A includes an elliptical faceted reflector, in which light is taken from one focus and images it to a second focus 404, whereas in FIG. 4B the light source(s) 104 includes a parabolic reflector, in which light is taken as a substantially collimated beam and is imaged onto a focus.

In FIG. 4A, the rays of light 406 are emitted at a first focus 402, are reflected off the elliptical reflector to become converging, converge to a second focus 402, and diverge onto the facets of the reflector 300. The facets of the reflector 300 then uniformly and evenly reflect the rays of light 406 onto the SLM pixels 110. In FIG. 4B, the rays of light 406 are emitted at a first focus 402, are reflected off the parabolic reflector to become collimated, and as collimated reflect onto the facets of the reflector 300'. The reflector 300 is indicated as the reflector 300' in FIG. 4B because whereas the reflector 300 in FIG. 4A is partially elliptical in shape, the reflector 300 in FIG. 4B is partially parabolic in shape. As such, the reflector 300 in FIG. 4A has an elliptical shape that may be considered as corresponding to the elliptical shape of the light source 104 in FIG. 4A, and the reflector 300' in FIG. 4B has a parabolic shape that may be considered as corresponding to the parabolic shape of the light source 104 in FIG. 4B. More generally, the shape of both the reflectors 300 and 300' are considered hyperbolic, where hyperbolic shapes or surfaces are inclusive of parabolic shapes or surfaces, elliptical shapes or surfaces, as well as other types of hyperbolic shapes or surfaces. The facets of the reflector 300' then uniformly and evenly illuminate reflect the rays of light 406 onto the SLM pixels 110. Therefore, in both FIGS. 4A and 4B, the resulting light that is illuminated onto the SLM pixels 110 is more uniform.

That is, the facets of the reflectors 300 and 300' divide the light 406 such that the resulting light that is incident upon the SLM pixels 110 is more uniform. The facets 306 effectively disperse the light incident upon the reflectors 300 and 300' so that different components of the light are mixed, and the resulting light is more uniform in illumination when arriving at the SLM pixels 110. The greater the number of facets, the more mixing of the light that occurs, resulting in greater uniformity of the illumination of the light that arrives at the SLM pixels 110.

The mixing of the light by the reflectors 300 and 300' can result in the output light as having overlapping beams when incident upon the SLM pixels 110, which also results in the greater uniformity of the illumination of the light that arrives at the pixels 110. Furthermore, the reflectors 300 and 300' that renders the light from the light source(s) 104 more uniform when arriving at the SLM pixels 110 is different than other reflectors that are part of the light source mechanism 102 itself, and which may themselves be faceted. The reflectors 300 and 300' in one embodiment of the invention can replace a large number of optical elements that would ordinarily be employed to render the light 406 more uniform, reducing the cost of the overall digital projection system 100.

That is, in one embodiment of the invention, the light 406 incident to the reflectors 300 and 300' is not uniform. The reflectors 300 and 300' serve to mix the light 406 becomes more uniform when incident upon the SLM pixels 110. That is, all of the light 406 is incident upon the reflectors 300 and 300', which mix the light as a result of their facets, so that the light incident upon the SLM pixels 110 is more uniform. It is noted that the reflectors 300 and 300' accomplish such mixing in a single reflection, or bounce, of the light 406. That is, each of the facets of the reflectors 300 and 300' only reflects the light once, distributing the light via a single reflection. This is as compared to condenser optics found in conventional projection systems, such as a condenser rod, in which light is reflected, or bounced, multiple times while being transmitted through such the condenser rod. As a result, the efficiency of the reflectors 300 and 300' is significantly greater than in such conventional systems. For instance, if it is assumed that reflecting light reduces the brightness of the light by 2%, the reflectors 300 and 300' provide for 98% of the original brightness of the light to reach the SLM pixels 110. By comparison, within a conventional projection system, each bounce reduces the light output from the previous bounce by 2%. If there are seven bounces within a conventional condenser rod, then the efficiency of the rod is only $98\%^7=86.8\%$.

Furthermore, in an alternative embodiment of the invention, the reflectors 300 and 300' just reflect a small portion of the light 406 that is relatively uniform, and expands that portion of the light 406 so that it is reflected onto all of the SLM pixels 110. For instance, the illumination profile 200 of FIGS. 2A and 2B is substantially uniform at the center 202. Therefore, the reflectors 300 and 300' may reflect just this central portion of light, and expansively image that central portion onto the SLM pixels 110. As a result, the light incident upon the SLM pixels 110 is more uniform, since just a portion of the light output from the light source 104 is used to illuminate the SLM pixels 110. In this embodiment of the invention, the reflectors 300 and 300' function as spatial homogenizers, which via a single reflection or bounce of light images or distributes a small cross-sectional area of the light onto all the SLM pixels 110.

Figure 5A:
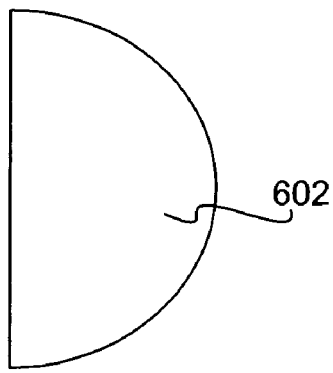
FIGS. 5A, 5B, and 5C are diagrams of representative facets, according to varying embodiments of the invention.
Figure 5B:
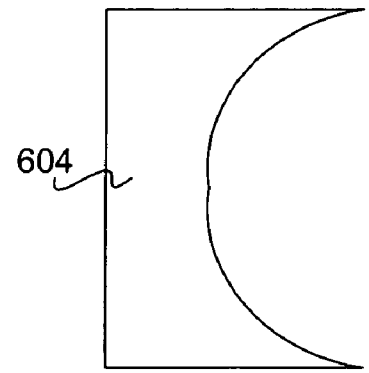
Figure 5C:
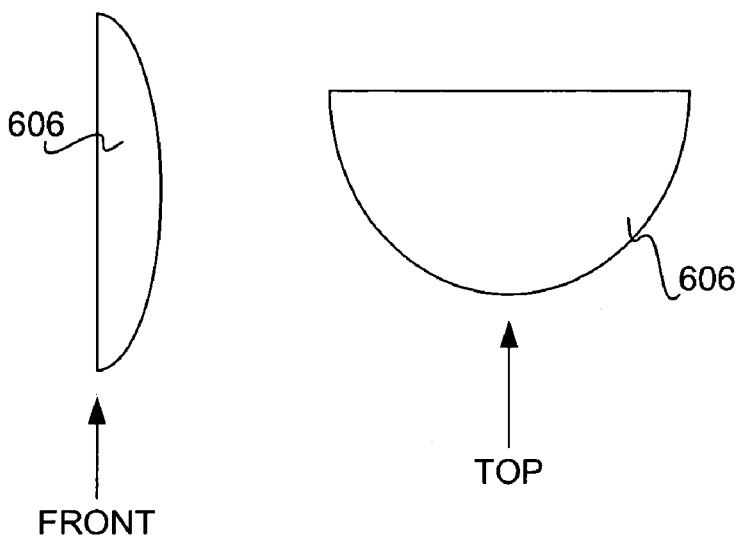

The facets 306 of the reflectors 300 and 300' have been depicted in FIGS. 3 and 4 as being flat. The facets 306 may have other shapes as well, such as convex, concave, anamorphic, and so on. FIGS. 5A, 5B, and 5C show other shapes that the facets of a multi-faceted reflector may assume, according to varying embodiments of the invention. In FIG. 5A, the representative facet 602 is spherical in shape. In FIG. 5B, the representative facet 604 is concave in shape. In FIG. 5C, the representative facet 606 is anamorphic in shape, where the term anamorphic may generally be defined as having different optical imaging effects along mutually perpendicular radii. That is, the front view of the facet 606 has a different shape than the top view of the facet 606, an example of which is shown in FIG. 5C. The facets of a multi-faceted reflector may have still other shapes than those that have been depicted and described.

Methods and Conclusion

Figure 6:
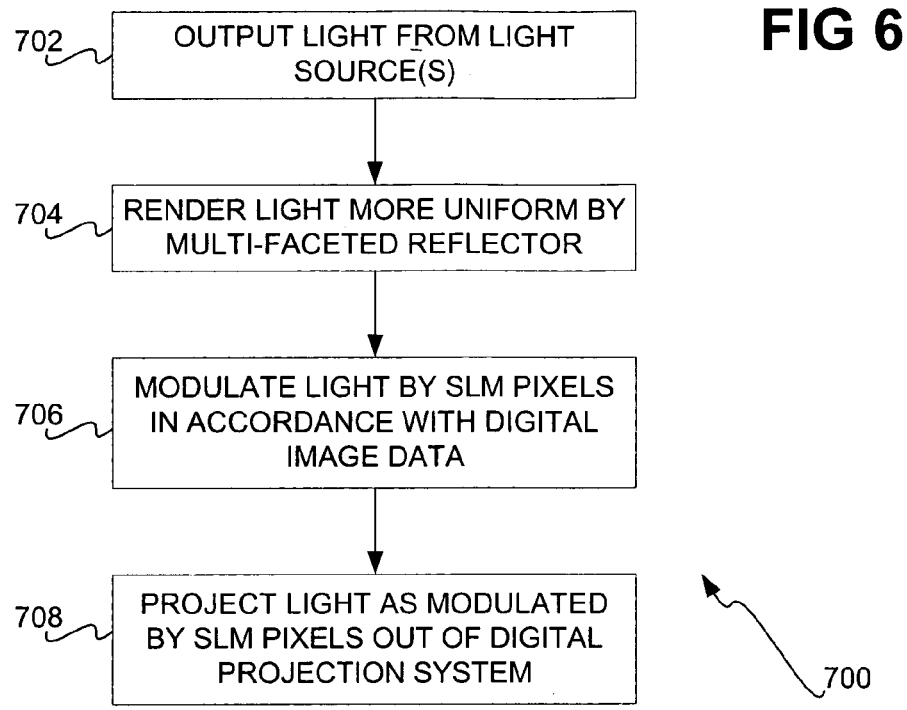
FIG. 6 is a flowchart of a method of use of a digital projection system having a multi-faceted reflector, according to an embodiment of the invention.

FIG. 6 shows a method of use 700 for the digital projection system 100 that has been described, according to an embodiment of the invention. Light is output from the light source(s) 104 of the light source mechanism 102 (702). This light is rendered more uniform by the multi-faceted reflector 300 of the illumination optics mechanism 108, and also aimed by the mechanism 108 onto the spatial light modulator (SLM) pixels 110 (704). The SLM pixels 110 then modulate the light in accordance with the digital image data 116 received from the image source 720 (706), where the controller 712 controls the SLM pixels 110 in accordance with the digital image data 116. Finally, the resulting modulated light is projected by the projection optics mechanism 118 external to the digital projection system 100 (708), such as onto the screen 122.

Figure 7:
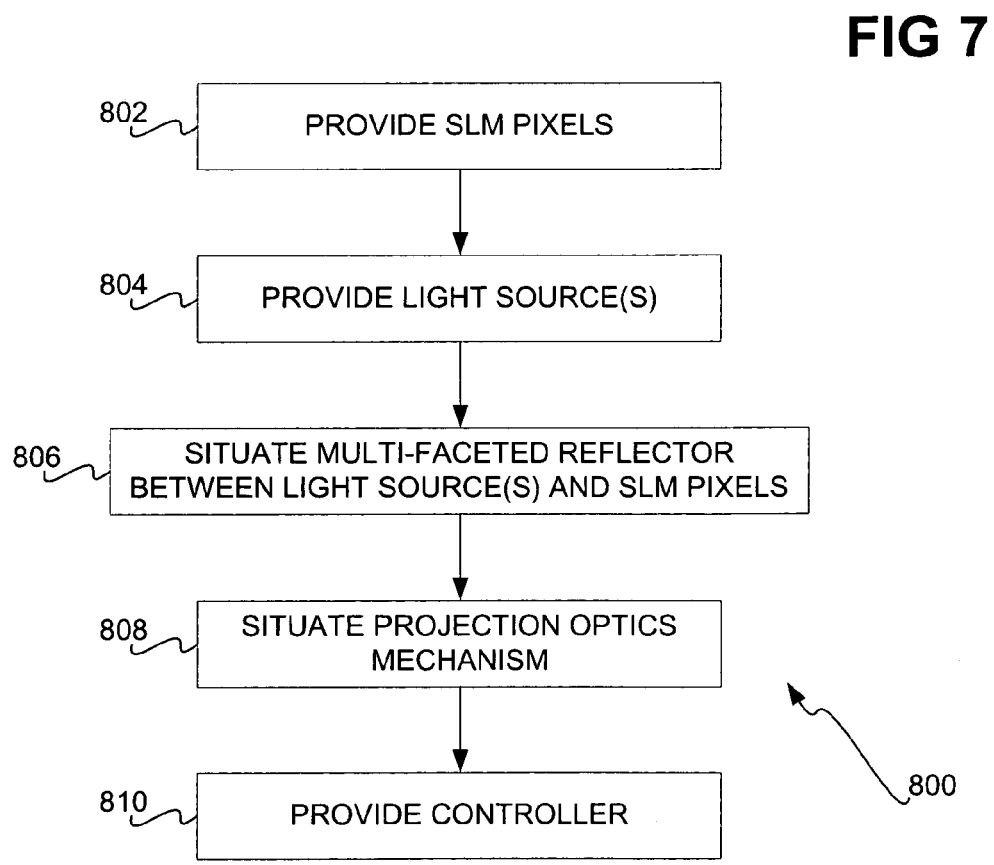
FIG. 7 is a flowchart of a method of manufacture of a digital projection system having a multi-faceted reflector, according to an embodiment of the invention.

FIG. 7 shows a method of manufacture 800 for the digital projection system 100 that has been described, according to an embodiment of the invention. The SLM pixels 802 for the digital projection system 100 are provided (802), as well as the light source(s) 104 of the light source mechanism 102 (804). The multi-faceted reflector 300 of the illumination optics mechanism 108 is situated within the optical path between the light source(s) 104 and the SLM pixels 110 (806), so that the reflector 300 is able to affect the light output by the light source(s) 104 and render its illumination more uniform upon incidence to the SLM pixels 110. The projection optics mechanism 118 is further situated within the optical path leading from the SLM pixels 110 to outside of the digital projection system 100 (808), and the controller 112 is provided (810) for controlling the SLM pixels 110 in accordance with the digital image data 116.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

I claim:

1. An optical reflector physically positioned after one or more light sources within a digital projection system also including one or more spatial light modulators (SLM's), comprising:
 a reflective substrate having a surface to render non-uniform light from the light sources to the SLM's more uniform with one reflection off the substrate, the substrate physically positioned after the light sources; and,
 a plurality of facets within the surface of the substrate.

2. The optical reflector of claim 1, wherein the substrate is at least partially parabolic in shape.

3. The optical reflector of claim 1, wherein the substrate is at least partially hyperbolic in shape.

4. The optical reflector of claim 1, wherein the facets mix the non-uniform light from the light sources in one reflection therefrom to render the light more uniform upon arriving at the SLM's.

5. The optical reflector of claim 1, wherein the facets image a uniform portion of the non-uniform light from the light sources onto the SLM's in one reflection to render the light more uniform at the SLM's.

6. The optical reflector of claim 1, wherein surface of the reflective substrate renders the non-uniform light more uniform with an efficiency greater than 95%.

7. The optical reflector of claim 1, wherein the plurality of facets are each flat.

8. The optical reflector of claim 1, wherein the plurality of facets are each spherical.

9. The optical reflector of claim 1, wherein the plurality of facets are each anamorphic.

10. The optical reflector of claim 1, wherein the plurality of facets are each convex.

11. The optical reflector of claim 1, wherein the plurality of facets are each concave.

12. The optical reflector of claim 1, wherein the substrate is curved.

13. The optical reflector of claim 1, wherein the substrate is aspherical.

14. The optical reflector of claim 1, wherein the substrate is at least partially elliptical.

15. The optical reflector of claim 1, wherein the substrate is at least partially conical.

16. The optical reflector of claim 1, wherein the substrate is at least partially off-axis.

17. The optical reflector of claim 1, wherein the plurality of facets are each curved.

18. The optical reflector of claim 1, wherein the plurality of facets are each aspherical.

19. The optical reflector of claim 1, wherein the plurality of facets are each asymmetrical.

20. The optical reflector of claim 1, wherein the plurality of facets are each off-axis.

21. An optical reflector physically positioned after one or more light sources within a digital projection system also including one or more spatial light modulators (SLM's), comprising:
 a substrate having a surface, the substrate physically positioned after the light sources; and,
 a plurality of features within the surface of the substrate to render illumination from the light sources more uniformly on the SLM's within the digital projection system in one reflection.

22. The optical reflector of claim 13, wherein the substrate is one of partially elliptical and partially parabolic and in shape.

23. The optical reflector of claim 13, wherein the substrate is hyperbolic in shape.

24. The optical reflector of claim 21, wherein surface of the reflective substrate renders the non-uniform light more uniform with an efficiency greater than 95%.

25. The optical reflector of claim 21, wherein the plurality of features comprise one or more of: a plurality of flat facets, a plurality of spherical facets, a plurality of anamorphic facets, a plurality of convex facets, and a plurality of concave facets.

26. A digital projection system comprising:
 a plurality of spatial light modulators (SLM's) that are controlled in accordance with digital image data to be projected by the digital projection system;
 one or more light sources to output light for modulation by the plurality of SLM's; and,
 an optical mechanism physically situated after the light sources, and having a plurality of facets on a hyperbolic reflective surface to reflect the light output by the light sources once before arriving at the plurality of SLM's.

27. The digital projection system of claim 26, wherein the optical mechanism is a partially elliptically shaped mirror having the plurality of facets that reflect light from the light sources onto the plurality of SLM's.

28. The digital projection system of claim 26, wherein the optical mechanism is a partially parabolically shaped mirror having the plurality of facets that reflect light from the light sources onto the plurality of SLM's.

29. The digital projection system of claim 26, wherein the optical mechanism is a reflector having the plurality of facets, light from the light sources transmitted through the plurality of facets and onto the plurality of SLM's.

30. The digital projection system of claim 26, wherein the plurality of facets comprise one or more of: a plurality of flat facets, a plurality of spherical facets, a plurality of anamorphic facets, a plurality of convex facets, and a plurality of concave facets.

31. The digital projection system of claim 26, further comprising:
- a projection optics mechanism to guide the light as modulated by the plurality of SLM's outward from the digital projection system; and,
- a controller to control the plurality of SLM's in accordance with the digital image data.

32. A digital projection system comprising:
- a plurality of spatial light modulators (SLM's) that are controlled in accordance with digital image data to be projected by the digital projection system;
- one or more light sources to output light for modulation by the plurality of SLM's; and,
- an optical substrate physically situated after the light sources and having a plurality of features to render the light from the light sources more uniformly onto the plurality of SLM's with one reflection of the light.

33. The digital projection system of claim 32, wherein the substrate is one of partially elliptical and partially parabolic in shape.

34. The digital projection system of claim 32, wherein the plurality of features comprise one or more of: a plurality of flat facets, a plurality of spherical facets, a plurality of anamorphic facets, a plurality of convex facets, and a plurality of concave facets.

35. A digital projection system comprising:
- means for spatially modulating light in accordance with image data to be projected by the digital projection system;
- means for outputting the light to be spatially modulated; and,
- means for rendering the light more uniformly after output of the light and before spatial modulation of the light, with one reflection of the light, the means for rendering the light more uniformly physically positioned after the means for outputting the light.

36. A method comprising:
- outputting light from one or more light sources of a digital projection system onto a plurality of facets of an optical substrate of the digital projection system, the optical substrate physically situated after the light sources of the digital projection system; and,
- rendering the light more uniformly by the plurality of facets of the optical substrate, onto a plurality of spatial light modulators (SLM's) of the digital projection system, by the plurality of facets singly reflecting the light.

37. The method of claim 36, wherein rendering the light more uniformly by the plurality of facets of the optical substrate comprises the plurality of facets mixing the light output from the one or more light source such that the light is more uniform when arriving at the plurality of SLM's.

38. The method of claim 36, wherein rendering the light more uniformly by the plurality of facets of the optical substrate comprises the plurality of facets imaging a portion the light output from the one or more light source by the plurality of facets such that the light is more uniform when arriving at the plurality of SLM's.

39. The method of claim 36, further comprising:
- modulating the light by the plurality of SLM's in accordance with digital image data received by the digital projection system; and,
- projecting the light as modulated by the plurality of SLM's outward from the digital projection system.

40. A method comprising:
- providing a plurality of spatial light modulators (SLM's) of a digital projection system that are controllable in accordance with digital image data to be projected by the digital projection system;
- providing one or more light sources of the digital projection system capable of outputting light for modulation by the plurality of SLM's; and,
- physically situating an optical mechanism of the digital projection system after the light sources, the optical mechanism having a plurality of facets to render the light output by the light sources more uniformly via a single reflection before arriving at the plurality of SLM's.

41. The method of claim 40, wherein situating the optical mechanism having the plurality of facets comprises situating the optical mechanism having one or more of: a plurality of flat facets, a plurality of spherical facets, a plurality of anamorphic facets, a plurality of convex facets, and a plurality of concave facets.

42. The method of claim 40, further comprising:
- providing a projection optics mechanism of the digital projection system capable of guiding the light as modulated by the plurality of SLM's outward from the digital projection system; and,
- providing a controller of the digital projection system that is capable of controlling the plurality of SLM's in accordance with the digital image data.

* * * * *